(12) United States Patent
Karpman

(10) Patent No.: US 6,713,829 B1
(45) Date of Patent: Mar. 30, 2004

(54) SINGLE UNIT POSITION SENSOR

(75) Inventor: Maurice S. Karpman, Brookline, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/386,579

(22) Filed: Mar. 12, 2003

(51) Int. Cl.$^7$ .......................... H01L 29/82; H01L 27/14; H01L 29/84
(52) U.S. Cl. ...................... 257/415; 257/414; 257/417
(58) Field of Search .................. 257/414, 415, 257/417

(56) References Cited

U.S. PATENT DOCUMENTS

| | | | |
|---|---|---|---|
| 5,314,572 A | 5/1994 | Core et al. | 156/643 |
| 5,326,726 A | 7/1994 | Tsang et al. | 437/228 |
| 6,121,552 A | 9/2000 | Brosnihan et al. | 174/253 |
| 6,122,961 A | 9/2000 | Geen et al. | 73/504.12 |
| 6,448,622 B1 | 9/2002 | Franke et al. | 257/415 |
| 6,470,748 B1 | 10/2002 | Geen | 73/504.12 |
| 6,505,511 B1 | 1/2003 | Geen et al. | 73/504.12 |
| 6,505,512 B2 | 1/2003 | Geen et al. | 73/504.14 |
| 6,510,745 B2 | 1/2003 | Geen | 73/861.356 |
| 6,516,651 B1 | 2/2003 | Geen | 73/1.16 |
| 2001/0034077 A1 * | 10/2001 | Wine et al. | 438/52 |
| 2003/0045011 A1 * | 3/2003 | Sandhu et al. | 438/14 |

OTHER PUBLICATIONS

M. Puttré, Satellite–Guided Munitions, Scientific American, pp. 68–73, Feb. 2003.
J. Yoshida, Motorola Samples GPS Device Build In IBM's SiGe Process, EE Times, Sep. 24, 2002.
Motorola Unveils Latest In Family Of Single Chip GPS Devices, Sep. 23, 2002.
P. Shih et al., A Useful Role for the ADXL202 Dual–Axis Accelerometer in Speedometer–Independent Car–Navigation Systems, Analog Dialogue 35–04, pp. 1–3, 2001.

* cited by examiner

Primary Examiner—Ngân V. Ngô
(74) Attorney, Agent, or Firm—Bromberg & Sunstein LLP

(57) ABSTRACT

A position sensor includes a receiver capable of receiving a position signal from an external source, and an inertial motion unit capable of sensing movement and producing a movement signal based upon the sensed movement. The position sensor also includes a processor operatively coupled with the receiver and the inertial motion unit. The processor is capable of calculating position information based on at least one of the position signal and the movement signal. Moreover, the receiver, inertial motion unit and processor are formed on a single chip.

21 Claims, 7 Drawing Sheets

SINGLE UNIT POSITION SENSOR

FIELD OF THE INVENTION

The invention generally relates to single chip devices and, more particularly, the invention relates to single unit position sensors.

BACKGROUND OF THE INVENTION

Global Positioning Systems are widely used as navigational aids. Among other things, they typically include a high performance RF receiver to receive RF signals from orbiting satellites, and a microprocessor to calculate position information based on the received RF signals. Because they must receive the RF signals to calculate position, Global Positioning Systems rely upon an unobstructed line of sight to the satellites.

There are instances, however, when the line of sight to the satellites is obstructed. For example, tall buildings in urban areas can obstruct the line of sight to the satellites. The art has responded to this problem by coupling Inertial Motion System chips with Global Positioning System chips. For example, an IMEMS® gyroscope, available from Analog Devices, Inc. of Norwood, Mass., could be used in this application. Accordingly, when the receiver loses contact with the satellites, the Inertial Motion System can deliver movement information to the processor, which then can calculate the actual position information.

There are a number of disadvantages associated with using a two-chip design. Specifically, as known by those skilled in the art, using two chips to accomplish the overall functionality typically increases the size, power requirements, and cost of the device, while also reducing reliability. The currently available manufacturing processes for forming currently available Global Position Sensors and Inertial Motion Sensors, however, are incompatible and thus, cannot produce the combined functionality on a single chip.

SUMMARY OF THE INVENTION

In accordance with one aspect of the invention, a position sensor includes a receiver capable of receiving a position signal from an external source, and an inertial motion unit capable of sensing movement and producing a movement signal based upon the sensed movement. The position sensor also includes a processor operatively coupled with the receiver and the inertial motion unit. The processor is capable of calculating position information based on at least one of the position signal and the movement signal. Moreover, the receiver, inertial motion unit and processor are formed on a single chip.

In illustrative embodiments, the single chip is a MEMS device. The receiver also may include radio frequency circuitry, while the inertial motion unit may include at least one of an angular rate sensor and an accelerometer. The processor may include a microprocessor. In some embodiments, the receiver is formed at least in part from a material having a higher electron mobility than that of single crystal silicon. In addition, the inertial motion unit may include first structure capable of moving relative to second structure, where the first structure is formed by a material comprising geranium. For example, the first structure may be a beam that moves relative to a stationary portion of the remainder of the inertial motion unit. Interdigitated fingers, for example, may sense the movement.

In accordance with another aspect of the invention, a single unit MEMS device (i.e., formed on a single chip or die) has a movable structure capable of moving relative to other portions of the MEMS device, and high performance circuitry capable of processing a position signal received from an external source. The position information is calculable based upon at least one of the movement of the movable structure and the processed position signal from the circuitry.

The circuitry illustratively includes a set of transistors capable of processing a signal having a frequency that is substantially equal to or greater than about 200 megahertz. For example, the circuitry may include radio frequency circuitry for processing the position signal. In addition, the circuitry may be formed at least in part from a material having a higher electron mobility than that of single crystal silicon.

In some embodiments, the movable structure is a part of at least one of a gyroscope and an accelerometer. The MEMS device thus may have processor circuitry operatively coupled with radio frequency circuitry, where the processor circuitry is capable of determining position based on at least one of the movement of the movable structure and the processed position signal from the radio frequency circuitry. The movable structure illustratively is formed from a material formed at least in part from geranium.

In accordance with other aspects of the invention, a MEMS device has a movable structure capable of moving relative to other portions of the MEMS device, and circuitry capable of processing a signal having a frequency that is substantially equal to or greater than about 200 megahertz. The movable structure and circuitry cooperate to deliver an output signal. Such output signal can include position information.

In some embodiments of the invention, the movable structure is a part of at least one of an angular rate sensor and an accelerometer. The circuitry also may be capable of processing a signal having a frequency that is substantially equal to or greater than about 1.5 gigahertz.

In accordance with still other aspects of the invention, a multi-layered wafer for producing a MEMS device includes first and second layers, and an oxide layer between the first and second layers. The wafer further includes a material layer formed on one of the first and second layers, where the material layer is formed (at least in part) from a material having a higher electron mobility than that of either of the first and second layers.

In accordance with yet another aspect of the invention, a method of producing a MEMS device provides a composite wafer having a silicon on insulator wafer having first and second silicon layers, and an oxide layer between the silicon layers. The composite wafer also includes a material layer on the silicon on insulator wafer, where the material layer includes a material having a higher electron mobility than that of any material on the silicon on insulator wafer. The method then forms electronics (i.e., circuitry) on the material layer.

Structure may be formed on one of the first and second silicon layers. The electronics may include RF circuitry.

In accordance with another aspect of the invention, a method of forming a MEMS device provides a wafer having a material layer deposited on a first silicon layer. The material layer includes a material having a higher electron mobility than that of the silicon layer. The method forms circuitry on the material layer, and forms a second layer, where the material layer is between the first silicon layer and the second layer. The method then forms structure on the second layer.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, the functionality of both a global positioning system ("GPS") and an inertial motion system (also referred to as an inertial motion unit, or "IMU") are integrated into a single MEMS chip design. Accordingly, in addition to improving reliability when compared to a two-chip design, the overall size, power requirements, and cost of the device also should be reduced. Various examples and embodiments are discussed below, as well as methods of producing such devices.

Figure 1:
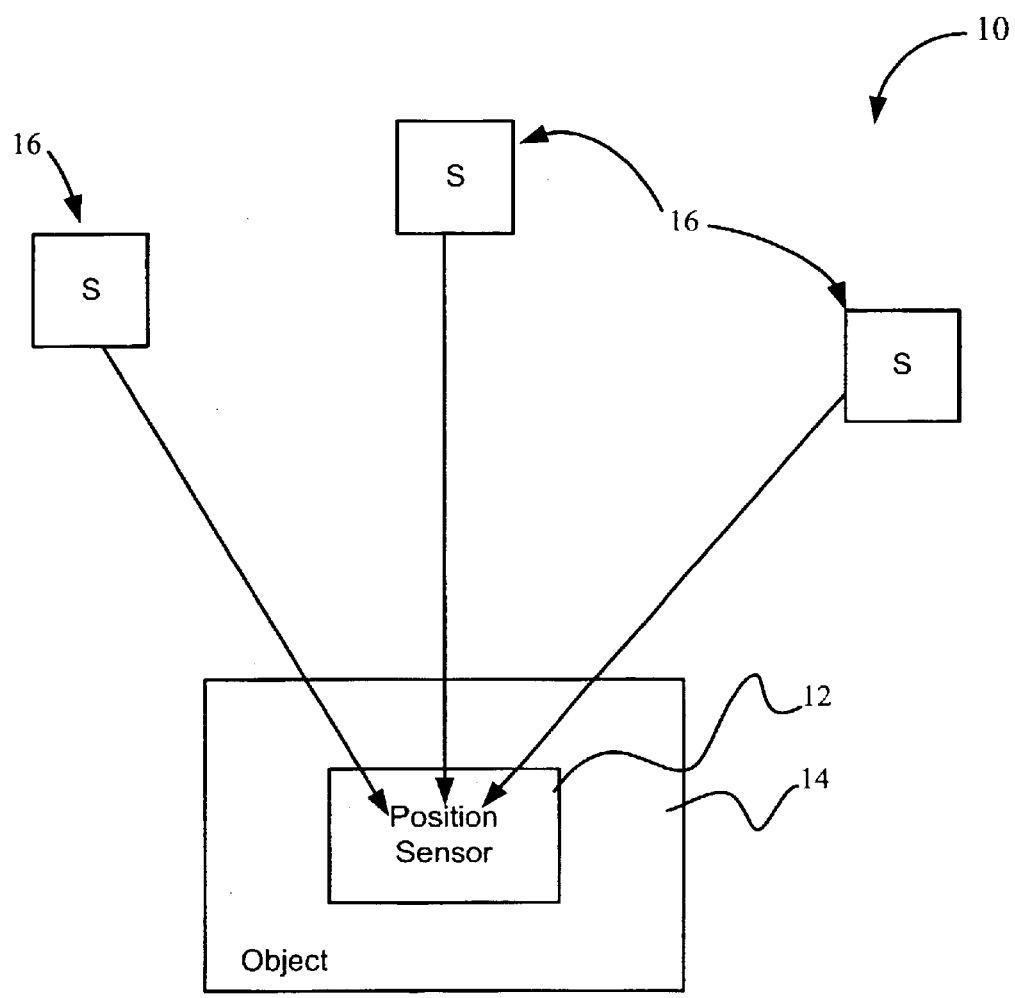
FIG. 1 schematically shows a conventional GPS network in which illustrative embodiments of the invention may be implemented.

FIG. 1 schematically shows a conventional GPS network 10 in which illustrative embodiments of the invention may be implemented. The network 10 includes a single chip position sensor 12 mounted on an object 14 being tracked (e.g., an automobile), and three orbiting satellites 16 that communicate with the position sensor 12. As known by those skilled in the art, the position sensor 12 uses conventional triangulation techniques to calculate its absolute position on Earth. It should be noted, however, that discussion of this specific network 10 is exemplary and not intended to limit the scope of the invention. Various embodiments may be used with other position tracking networks, such as those not yet implemented.

Figure 2:
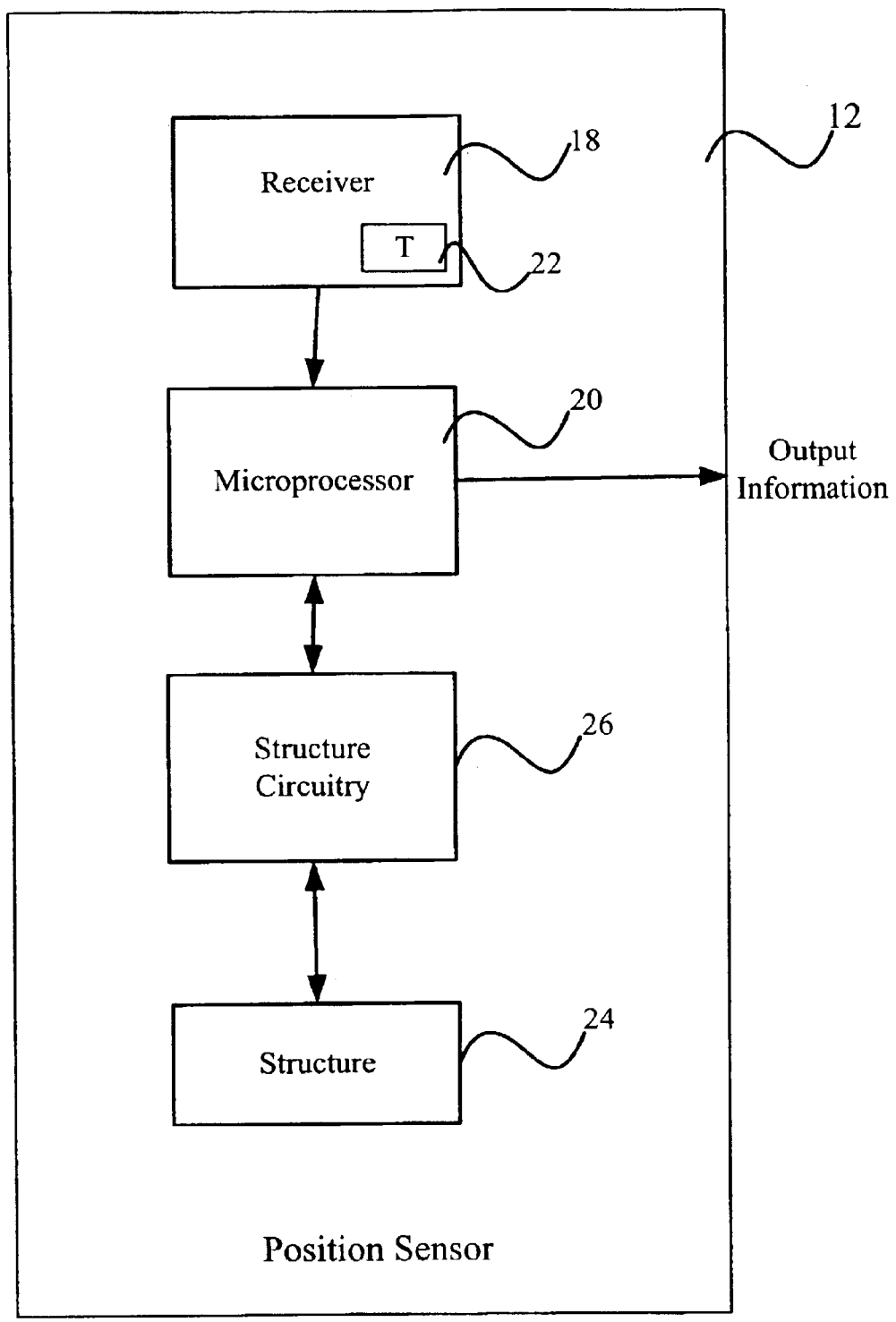
FIG. 2 schematically shows an exemplary position sensor produced in accordance with illustrative embodiments of the invention.

FIG. 2 schematically shows additional details of the single chip position sensor 12 shown in FIG. 1. In illustrative embodiments, the position sensor 12 is implemented as a microelectromechanical system ("MEMS") device. More specifically, the position sensor 12 includes a conventional radio frequency ("RF") receiver 18 to receive and process high frequency timing signals (e.g., greater than about 15 gigahertz) from the orbiting satellites 16, and a conventional microprocessor 20 to calculate position information based upon the received timing signals. Both the receiver 18 and microprocessor 20 may be considered to comprise the GPS portion of the single chip position sensor 12.

As noted, the receiver 18 includes conventionally known high performance circuitry (see transistors 22 schematically shown in FIG. 2) to accomplish its function (e.g., to amplify and digitize high frequency analog position signals from the satellites 16). Circuitry may be considered "high performance" circuitry (e.g., MOSFETS or bipolar junction transistors) when it is capable of adequately processing a signal having a frequency that is substantially equal to or greater than about 200 megahertz. In other words, high performance circuitry can process at least one signal having a frequency that is substantially equal to or greater than about 200 megahertz. The noted position signals, which typically have frequencies approximately equal to or greater than about 1.5 gigahertz, thus are processed by high performance circuitry. An exemplary GPS device that can be implemented on the disclosed position sensor 12 may be similar to that distributed under the trade name INSTANT GPS™ (part number MG4000) by Motorola, Inc. of Schaumburg, Ill. Of course, because other receivers and microprocessors may be used, discussion of the disclosed receiver 18 and microprocessor 20 is not intended to limit all embodiments of the invention.

In accordance with illustrative embodiments, the position sensor 12 also as conventional structure 24 (e.g., an oscillating beam) for detecting its actual motion (and thus, the object 14 being tracked), and conventional structure circuitry 26 to control and detect movement of such structure 24. Both the structure 24 and structure circuitry 26 may be considered to comprise the IMU portion of the single chip position sensor 12.

As noted above, the structure 24 and structure circuitry 26 cooperate to detect motion of the position sensor 12. Accordingly, the structure 24 may include one or both of a gyroscope to detect rotational movement, and an accelerometer to detect linear acceleration and deceleration. The embodiment having both a gyroscope and an accelerometer, for example, thus includes structure circuitry 26 for both actuating a proof mass, and detecting capacitive changes produced when the proof mass and other structure move. To those ends, the gyroscope may include interdigitated fingers. Such information then may be forwarded to the microprocessor 20 (e.g., via a position signal) for determining the actual location of the tracked object 14.

Exemplary structure 24 and structure circuitry 26 that may be used on the disclosed single chip position sensor 12 may be similar to that shown any one of the patents listed immediately below, the disclosures of which is incorporated herein, in their entireties, by reference. Analogous methods of producing the same also are disclosed in those patents. Of course, because other structure 24 and structure circuitry 26 may be used, discussion of the disclosed structure 24 and structure circuitry 26 is not intended to limit all embodiments of the invention. The various exemplary patents are as follows:

U.S. Pat. No. 6,122,961;
U.S. Pat. No. 6,510,745;
U.S. Pat. No. 6,516,651;
U.S. Pat. No. 6,470,748;
U.S. Pat. No. 6,505,511;
U.S. Pat. No. 6,505,512;
U.S. Pat. No. 5,314,572;
U.S. Pat. No. 5,326,726; and
U.S. Pat. No. 6,121,552.

Once formed on a single die/chip, the position sensor 12 may be enclosed within a conventional MEMS package. The various components of the sensor 12 may connect with pins (on the package) that permit, among other things, data control and transmission between the sensor components and an external device. For example, the external device may be another microprocessor and color display device to graphically show position information to an end user. In addition, the external device also may include a transponder to transmit the position information to a remote location, and receive other information (e.g., configuration information) from a remote source.

When in use, the GPS portion determines position information by triangulating high frequency analog signals received from the orbiting satellites 16. If the receiver 18 does not receive such signals (e.g., the line of sight to the satellites 16 is blocked), then the IMU portion and microprocessor 20 calculate the position information. When communication with the satellites 16 is restored, the GPS portion again may calculation position information. It should be noted that in many applications, the IMU portion of the position sensor 12 typically is not necessary when the GPS portion can communicate with the satellites 16.

Although conventional sub-systems (i.e., the receiver 18, structure 24, structure circuitry 26, and microprocessor 20) are used to form the position sensor 12, conventional processes for forming such sub-systems cannot be exclusively used. Rather, new methods of forming the position sensor 12 must be used. FIGS. 3, 4A–4F, 5, and 6A–6D show two exemplary methods of forming the position sensor 12 to produce the intended single-chip design. Some embodiments of the invention, however, can be formed with other processes. Accordingly, although the noted processes are preferable, other processes or variants of the discussed processes also may be used. Discussion of the preferable processes thus follow.

Figure 3:
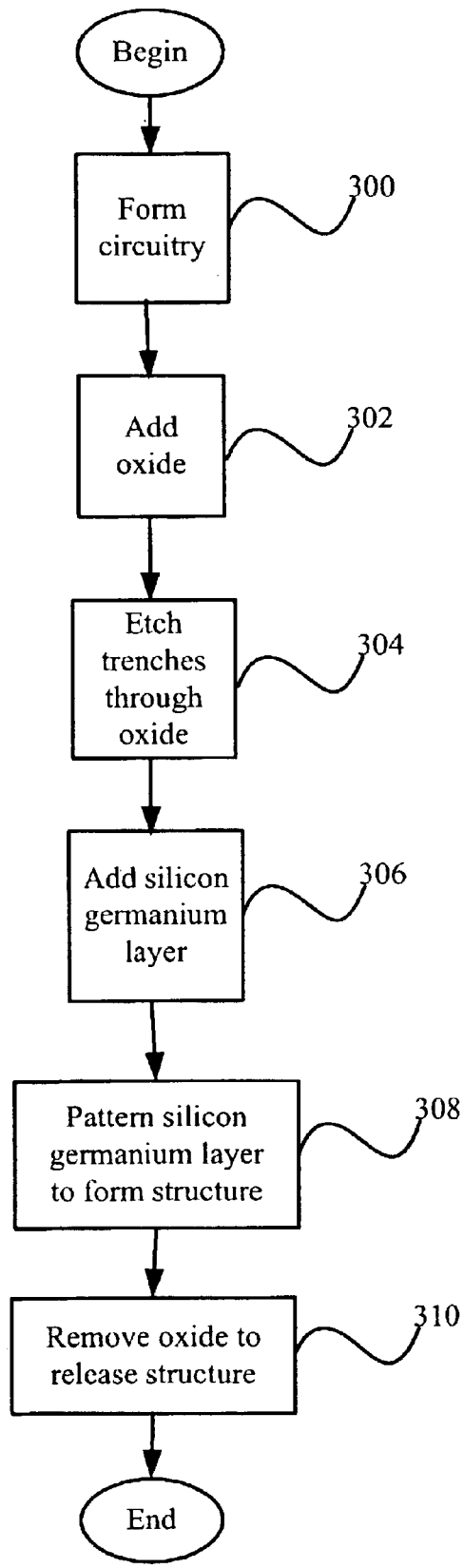
FIG. 3 shows a first illustrative process of forming a single unit position sensor, such as the position sensor shown in FIG. 2.

FIG. 3 shows a first illustrative process of forming the position sensor 12 in accordance with illustrative embodiments. FIGS. 4A–4F illustrate this process by schematically showing cross-sections of the position sensor 12 in various stages of the production process. The process begins at step 300, in which circuitry is formed on a single crystal silicon germanium layer 30 disposed on a single crystal silicon wafer 32 (also see FIG. 4A). Such circuitry includes the receiver 18, microprocessor 20, and the structure circuitry 26. To that end, an epitaxial single crystal silicon germanium layer 30 first is deposited on the top surface of the silicon wafer 32 in accordance with conventional processes. After the silicon germanium layer 30 is formed, conventional circuitry fabrication processes may form the noted circuitry.

This embodiment uses single crystal silicon germanium (in layer 30) because it has a higher electron mobility than that of silicon and thus, permits high performance circuitry to be formed. The concentration of silicon (in the layer 30), however, illustratively is greater than that of the germanium. For example, a concentration of ten percent germanium should produce satisfactory results. In alternative embodiments, the concentration of germanium may be greater than that of silicon.

Other embodiments may use a material other than single crystal silicon germanium. Such materials should have an electron mobility that is sufficient to accommodate high performance circuitry, and should match the underlying template material (i.e., the single crystal silicon wafer 32). For example, rather than being produced from silicon germanium, this layer may be produced from indium phosphide (InP).

Figure 4A:
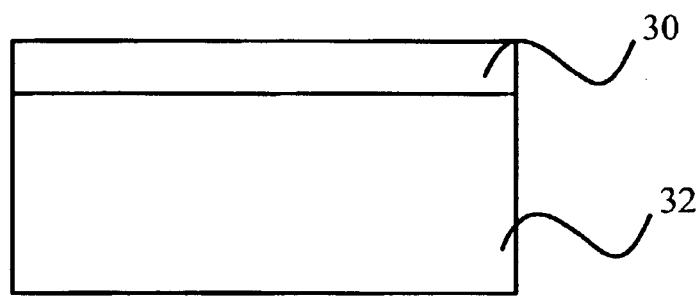
FIGS. 4A–4F schematically illustrate the progression of the process shown in FIG. 3.
Figure 4B:
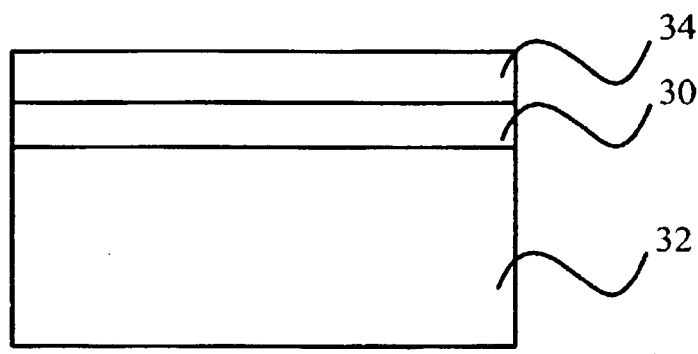
Figure 4C:
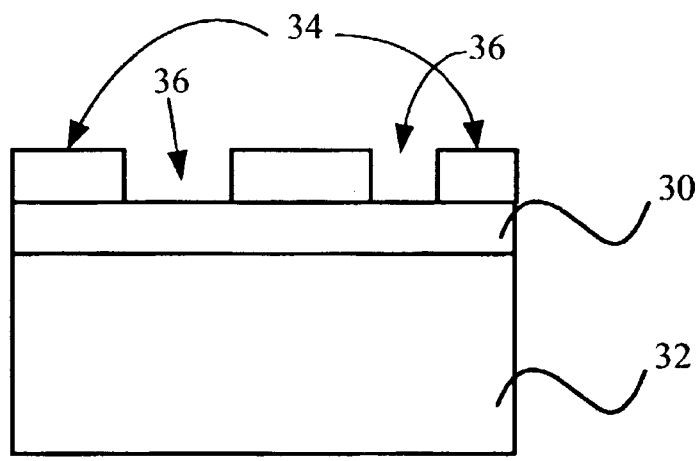
Figure 4D:
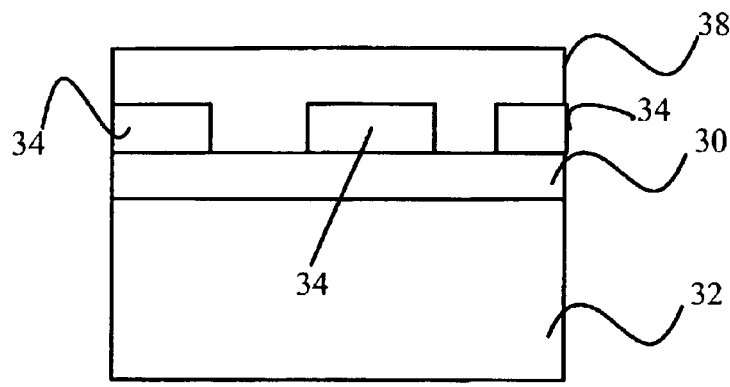

After the circuitry is formed on the silicon germanium layer 30, the process continues to step 302, in which an oxide 34 is formed over the top of the silicon germanium layer 30 (FIG. 4B). Trenches 36 then are etched through the oxide 34 (step 304 and FIG. 4C), followed by application of a polycrystaline silicon germanium layer 38 over the oxide layer 34 (step 306 and FIG. 4D). This polycrystaline silicon germanium layer 38 also extends through the trenches 36 to contact the single crystal silicon germanium layer 30.

Figure 4E:
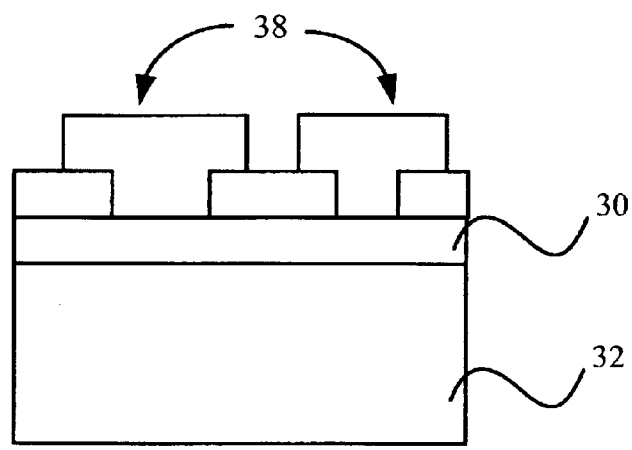
Figure 4F:
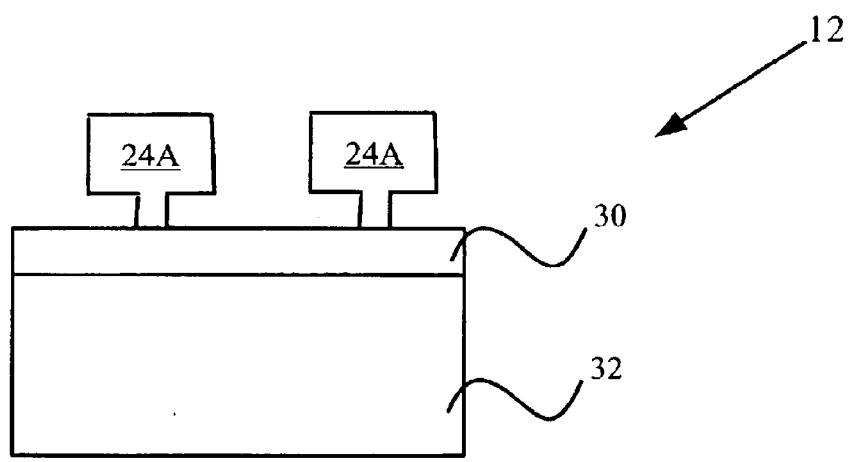

The process then continues to step 308, in which the polycrystaline silicon germanium layer 38 is patterned to form the structure 24A (FIG. 4E). As noted above, such structure 24A includes conventional gyroscope and/or accelerometer structure that moves in response to movement of the position sensor 12. Moreover, the polycrystaline silicon germanium layer 38 can be patterned at relatively low temperatures compared to those used with conventional polysilicon patterning processes. For example, it is anticipated that the patterning processes of step 308 can be conducted at temperatures on the order of about 400 degrees Celsius. This is in contrast to typical temperatures used to pattern polysilicon, which generally are on the order of about 1100 degrees Celsius. Consequently, in contrast to various prior art processes that use polysilicon to form the structure 24A, the circuitry formed at step 300 should be able to withstand the relatively low temperature patterning processes used by illustrative embodiments of the invention.

After the structure 24 is formed, it is released by removing the oxide 34 (step 310), thus producing the final position sensor 12. Post processing steps also can be conducted, such as testing and packaging processes.

In alternative embodiments, other materials may be used instead of the polycrystaline silicon germanium layer 38. Such materials also should to have a patterning temperature, however, that does not adversely affect the circuitry already formed on the single crystal silicon germanium layer 30. For example, pure germanium may be used.

In a similar manner, although the polycrystaline silicon germanium layer 38 can have various concentrations of silicon and germanium, it is preferable to have a higher concentration of germanium than that of silicon. In illustrative embodiments, the polycrystaline silicon germanium layer 38 has greater than a fifty percent concentration of germanium. This is preferable because the patterning temperatures required to form the structure 24 increase as the concentration of silicon increases in such layer. Those skilled in the art can select an appropriate concentration based upon, among other things, material cost and resultant patterning temperatures of the differing concentrations.

Figure 5:
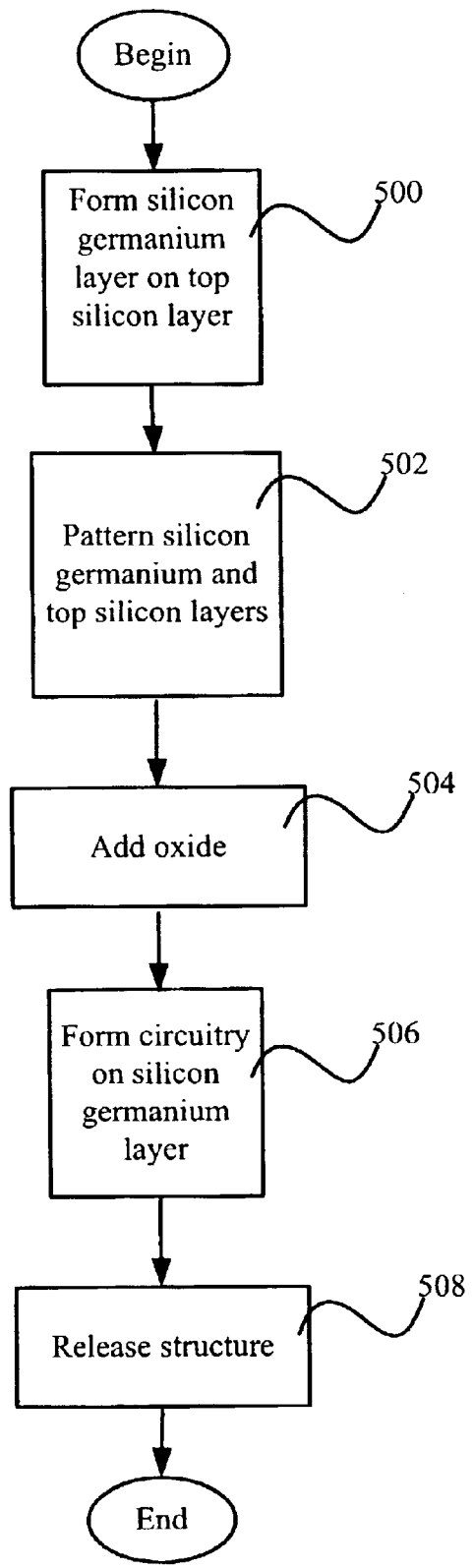
FIG. 5 shows a second illustrative process of forming a single unit position sensor, such as the position sensor shown in FIG. 2.

FIG. 5 shows a second illustrative process of forming the position sensor 12 in accordance with illustrative embodiments. FIGS. 6A–6D illustrate this process by schematically showing cross-sections of the position sensor 12 at various stages of the production process. One way this process differs from the first process of FIG. 3 is its use of silicon-on-insulator ("SOI") technology. It nevertheless has some similarities that also are discussed below.

Figure 6A:
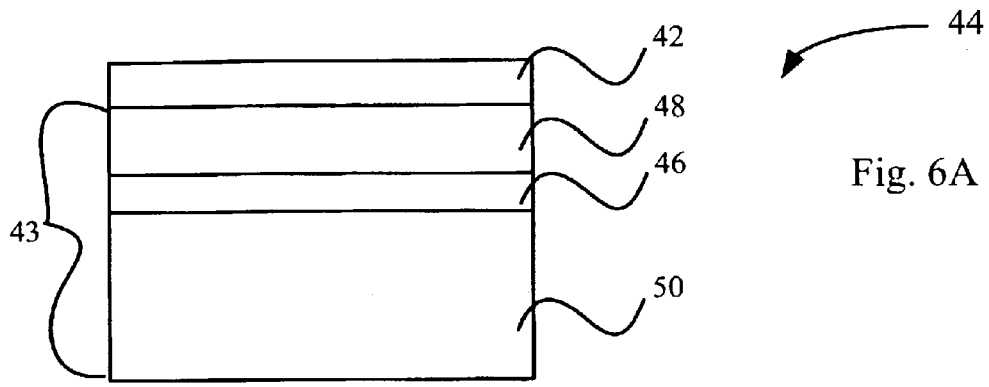
FIGS. 6A–6D schematically illustrate the progression of the process shown in FIG. 3.

The process of FIG. 5 begins at step 500, in which an epitaxial silicon germanium layer 42 (e.g., about one micron) is deposited on the top layer 48 of an SOI wafer 43 to produce a multi-layered wafer 44 (FIG. 6A). As known by those skilled in the art, the SOI wafer 43 is a three layer wafer having an oxide layer 46 formed between a pair of single crystal silicon layers 48 and 50. The top SOI wafer layer 48 typically is thinner than the bottom layer 50. This resultant multi-layered wafer 44 shown in FIG. 6A has properties that permit MEMS production in accordance with various embodiments of the invention.

Figure 6B:
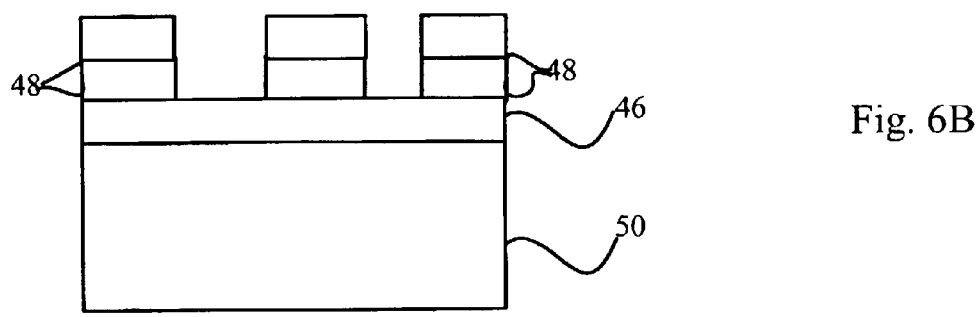

After the multi-layered wafer 44 is formed, the silicon germanium layer 42 and top silicon layer 48 are patterned to form the structure 24B (step 502 and FIG. 6B). As noted above, such structure 24 includes conventional gyroscope and/or accelerometer structure that moves in response to movement of the position sensor 12. Unlike the first process discussed with reference to FIG. 3, the processing temperatures of this step may be relatively high because no circuitry has been formed.

Figure 6C:
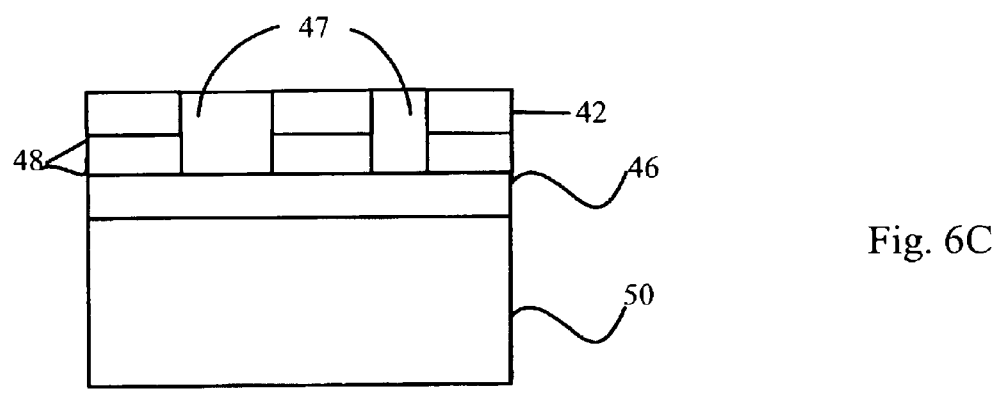
Figure 6D:
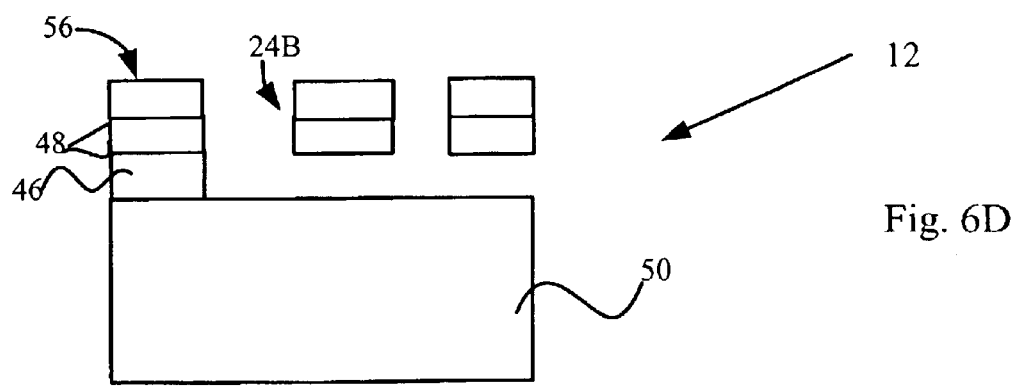

The process then continues to step 504, in which an oxide 47 is added to fill in the areas patterned during step 502 (FIG. 6C). The oxide 47 also is smoothed. Circuitry 56 (comprised of the receiver 18, microprocessor 20, and structure circuitry 26) then is formed on the silicon germanium layer 42 (step 506) and, after that, the structure 24B is released (step 508 and FIG. 6D) in accordance with conventional processes. The structure 24 illustratively is primarily comprised of patterned portions of the top silicon layer 48. As known by those in the art, the structure release step involves removing portions of the oxide layer 46 and added oxide 47.

In a manner similar to the process discussed above with regard to FIG. 3, this embodiment also uses single crystal silicon germanium to form the circuitry because such material has a higher electron mobility than that of silicon. Consequently, such material permits high performance circuitry to be formed. The concentration of silicon (in the silicon germanium layer 42) illustratively is greater than that of the germanium. For example, a ten percent concentration of germanium should produce satisfactory results.

Also similar to the process discussed above with regard to FIG. 3, other embodiments may use a material other than single crystal silicon germanium. Such materials should have an electron mobility that is sufficient to accommodate high performance circuitry, and should match the underlying template material (i.e., the top layer of silicon 48). For example, rather than being produced from silicon germanium, this layer also may be produced from indium phosphide (InP).

It should be noted that although the above discussion relates to combining the functionality of a GPS unit with that of an IMU on a single chip, those skilled in the art should understand that such implementation is exemplary. Accordingly, principles of various embodiments can be applied to other types of single chip devices that use high performance circuitry and inertial structural components on a single chip. In addition, discussion of MEMS devices also is exemplary and not intended to limit all embodiments of the invention. Accordingly, other types of single chip devices may be used.

Although various exemplary embodiments of the invention are disclosed, it should be apparent to those skilled in the art that various changes and modifications can be made that will achieve some of the advantages of the invention without departing from the true scope of the invention.

What is claimed is:

1. A single unit MEMS device comprising:
   a movable structure capable of moving relative to other portions of the MEMS device; and
   high performance circuitry capable of processing a position signal received from an external source,
   position information being calculable based upon at least one of the movement of the movable structure and the processed position signal from the circuitry.

2. The MEMS device as defined by claim 1 wherein the circuitry includes a set of transistors capable of processing a signal having a frequency that is substantially equal to or greater than about 200 megahertz.

3. The MEMS device as defined by claim 1 wherein the movable structure is a part of at least one of an angular rate sensor and an accelerometer.

4. The MEMS device as defined by claim 1 wherein the circuitry includes radio frequency circuitry for processing the position signal.

5. The MEMS device as defined by claim 4 further including processor circuitry operatively coupled with the radio frequency circuitry, the processor circuitry being capable of determining position based on at least one of the movement of the movable structure and the processed position signal from the radio frequency circuitry.

6. The MEMS device as defined by claim 1 wherein the circuitry is formed at least in part from a material having a higher electron mobility than that of single crystal silicon.

7. The MEMS device as defined by claim 1 wherein the movable structure is formed from a material comprising geranium.

8. A MEMS device comprising:
   a movable structure capable of moving relative to other portions of the MEMS device; and
   circuitry capable of processing a signal having a frequency that is substantially equal to or greater than about 200 megahertz,
   the movable structure and circuitry cooperating to deliver an output signal.

9. The MEMS device as defined by claim 8 wherein the movable structure is a portion of at least one of an accelerometer and a gyroscope.

10. The MEMS device as defined by claim 8 wherein the circuitry includes radio frequency circuitry.

11. The MEMS device as defined by claim 8 further including a processor operatively coupled with both the structure and the circuitry, the processor processing movement of the structure and signals produced by the circuitry to produce the output signal.

12. The MEMS device as defined by claim 8 wherein the circuitry is formed at least in part from a material having a higher electron mobility than that of single crystal silicon.

13. The MEMS device as defined by claim 8 wherein the output signal includes position information.

14. The MEMS device as defined by claim 8 wherein the circuitry is capable of processing a signal having a frequency that is substantially equal to or greater than about 1.5 gigahertz.

15. A position sensor comprising:
   a receiver capable of receiving a position signal from an external source;
   an inertial motion unit capable of sensing movement and producing a movement signal based upon the sensed movement; and
   a processor operatively coupled with the receiver and the inertial motion unit, the processor being capable of calculating position information based on at least one of the position signal and the movement signal,
   the receiver, inertial motion unit and processor being formed on a single chip.

16. The position sensor as defined by claim 15 wherein the chip is a MEMS device.

17. The position sensor as defined by claim 15 wherein the receiver includes radio frequency circuitry.

18. The position sensor as defined by claim 15 wherein the inertial motion unit includes at least one of a gyroscope and an accelerometer.

19. The position sensor as defined by claim 15 wherein the processor includes a microprocessor.

20. The position sensor as defined by claim 15 wherein the receiver is formed at least in part from a material having a higher electron mobility than that of single crystal silicon.

21. The position sensor as defined by claim 15 wherein the inertial motion unit includes first structure capable of moving relative to second structure, the first structure being formed by a material comprising geranium.

* * * * *